(12) United States Patent
Shahid et al.

(10) Patent No.: US 12,016,042 B2
(45) Date of Patent: Jun. 18, 2024

(54) DYNAMIC SWITCHING BETWEEN UPLINK WAVEFORMS

(71) Applicant: T-Mobile USA, Inc., Bellevue, WA (US)

(72) Inventors: Wafik Abdel Shahid, Kenmore, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 302 days.

(21) Appl. No.: 17/115,564

(22) Filed: Dec. 8, 2020

(65) Prior Publication Data

US 2022/0183012 A1 Jun. 9, 2022

(51) Int. Cl.
| | |
|---|---|
| H04W 72/53 | (2023.01) |
| G06N 20/00 | (2019.01) |
| H04L 27/26 | (2006.01) |
| H04W 52/24 | (2009.01) |
| H04W 52/36 | (2009.01) |
| H04W 64/00 | (2009.01) |
| H04W 72/0453 | (2023.01) |
| H04W 72/21 | (2023.01) |
| H04W 76/27 | (2018.01) |

(52) U.S. Cl.
CPC .......... *H04W 72/53* (2023.01); *G06N 20/00* (2019.01); *H04L 27/2607* (2013.01); *H04L 27/2636* (2013.01); *H04W 52/241* (2013.01); *H04W 52/242* (2013.01); *H04W 52/365* (2013.01); *H04W 64/00* (2013.01); *H04W 72/0453* (2013.01); *H04W 72/21* (2023.01); *H04W 76/27* (2018.02)

(58) Field of Classification Search
CPC ................................................ H04W 72/0493
See application file for complete search history.

(56) References Cited

U.S. PATENT DOCUMENTS 10,523,358 B1 * 12/2019 Park ..................... H04B 7/0686
2011/0176498 A1 * 7/2011 Montojo ........... H04W 72/1242
370/329

(Continued)

FOREIGN PATENT DOCUMENTS

WO   WO2018081972 A1   5/2018

OTHER PUBLICATIONS

Extended European Search Report dated May 6, 2022 for European Patent Application No. 21210558.9, 10 pages.

(Continued)

*Primary Examiner* — Guang W Li
(74) *Attorney, Agent, or Firm* — Lee & Hayes, P.C.

(57) ABSTRACT

Techniques for dynamically switching between uplink waveforms are discussed herein. For example, data received at a base station may provide the base station with information associated with a user equipment (UE). The base station may select a waveform for the UE to utilize during uplink transmissions in order to maximize performance of the UE. In some examples, the base station may select a DFT-s-OFDM or a CP-OFDM for the UE to utilize during the uplink transmission. The base station may determine which waveform to utilize based on data received from the UE, such as location data, signal data, and/or UE state data.

16 Claims, 7 Drawing Sheets

(56) References Cited

U.S. PATENT DOCUMENTS

| | | | |
|---|---|---|---|
| 2014/0328190 A1* | 11/2014 | Lord | H04W 24/08 |
| | | | 370/252 |
| 2018/0035423 A1* | 2/2018 | Wang | H04L 5/0021 |
| 2018/0092086 A1* | 3/2018 | Nammi | H04L 5/003 |
| 2018/0124710 A1* | 5/2018 | Ly | H04W 52/146 |
| 2018/0324715 A1* | 11/2018 | Ryoo | H04L 5/0053 |
| 2018/0331801 A1* | 11/2018 | Islam | H04L 5/0048 |
| 2018/0332542 A1 | 11/2018 | Wang et al. | |
| 2019/0296954 A1* | 9/2019 | Xing | H04L 27/0008 |
| 2019/0319758 A1* | 10/2019 | Yum | H04B 7/0643 |
| 2020/0007375 A1* | 1/2020 | Zhang | H04L 5/0048 |
| 2020/0187202 A1* | 6/2020 | Nammi | H04W 72/29 |
| 2021/0219129 A1* | 7/2021 | Liu | H04B 17/102 |
| 2021/0266848 A1* | 8/2021 | Ryoo | H04W 52/365 |
| 2021/0281455 A1* | 9/2021 | Lee | H04L 27/2627 |
| 2022/0052894 A1* | 2/2022 | Cha | H04L 27/2607 |
| 2022/0376965 A1* | 11/2022 | Ramirez-Gutierrez | |
| | | | H04W 72/23 |

OTHER PUBLICATIONS

Jiang, et al, "Key Enabling Physical Layer Technologies for LTE-Advanced", IEICE Transaction on Communication, vol. E92B, No. 5, May 1, 2009, pp. 1751-1759.

Qualcomm Incorporated, "UL waveform configuration", 3GPP Draft, vol. RAN WG1, Nov. 13, 2016, 6 pages.

The European Office Action mailed Apr. 5, 2023 for European patent application No. 21210558.9, a foreign counterpart of U.S. Appl. No. 17/115,564, 7 pages.

* cited by examiner

700 ↘

```
SEND, TO A BASE STATION, FIRST UPLINK DATA USING A FIRST UPLINK
WAVEFORM
702

↓

RECEIVE AN INDICATION TO SWITCH TO A SECOND UPLINK WAVEFORM
VIA A PHYSICAL DOWNLINK CONTROL CHANNEL (PDCCH)
704

↓

SEND, TO THE BASE STATION, SECOND UPLINK DATA USING THE
SECOND UPLINK WAVEFORM
706
```

FIG. 7

DYNAMIC SWITCHING BETWEEN UPLINK WAVEFORMS

BACKGROUND

Modern user equipment (UEs) are required to support uplink transmission waveforms defined as Discrete Fourier Transform Spread Orthogonal Frequency Division Multiplexing (DFT-s-OFDM) waveforms and Cyclic Prefix OFDM (CP-OFDM) waveforms. Each waveform has unique characteristics that can enhance operation in particular conditions.

For example, DFT-s-OFDM waveforms can be considered to be a power efficient waveform for uplink transmission that can help conserve transmission power and/or can be used to help extend cell edge coverage. CP-OFDM waveforms can be considered to be a performance waveform for uplink transmission that can be used to maximize UE throughput during the uplink transmission. Determining the proper waveform to utilize during the uplink transmission improves the performance of the UE as well as the overall performance of a network supporting the UE.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 illustrates another example process for dynamic waveform switching.

DETAILED DESCRIPTION

Figure 1:
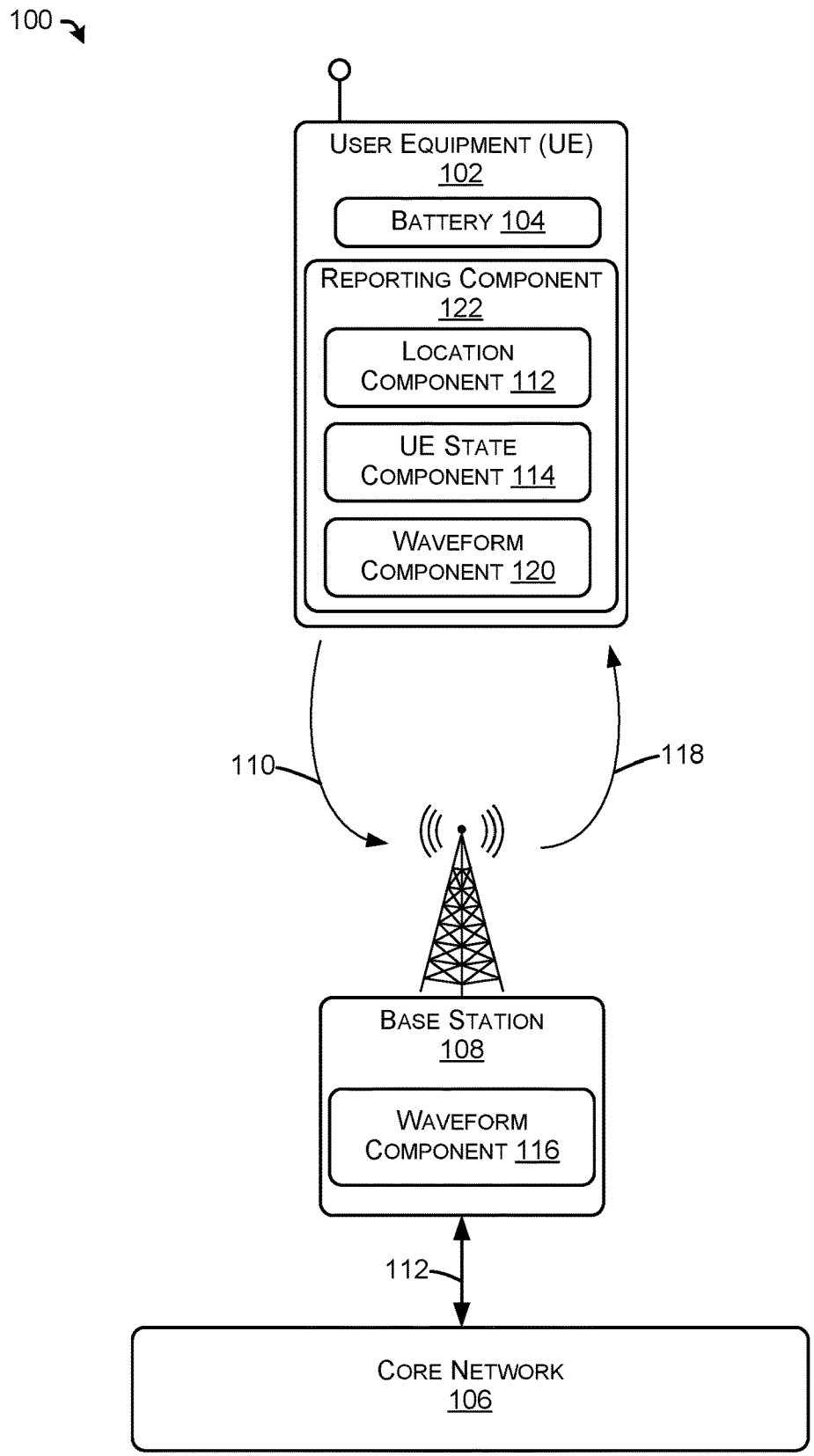
FIG. 1 shows an example network environment in which a UE can switch uplink waveforms in a telecommunication network.

Techniques for dynamically switching between uplink waveforms are discussed herein. For example, data received at a base station may provide the base station with information associated with a UE. The base station may select a waveform for the UE to utilize during uplink transmissions in order to maximize performance of the UE. In some examples, the base station may select a DFT-s-OFDM waveform for the UE in order for the UE to conserve power and/or extend cell edge coverage. In some examples the base station may select a CP-OFDM waveform for the UE in order to maximize UE throughput during the uplink transmission. The base station may determine which waveform to utilize based on data received from the UE, such as location data, signal data, and/or UE state data.

Each waveform that a UE utilizes for uplink transmission has unique characteristics that can enhance operation in particular conditions. Conventional operation selects a waveform configuration (e.g., DFT-s-OFDM or CP-OFDM) at the start of a call session and the UE does not change the waveform throughout a communication session. As the conditions associated with the UE change, (e.g., location changes, signal data changes, state data changes, etc.) the initial waveform selected at the start of the call session may not be the most optimal waveform to use for the current condition.

By dynamically switching between uplink waveforms, the base station may enable the UE to maximize performance and use the optimal waveform during uplink transmission. For example, a base station may receive uplink data from a UE that includes information associated with the UE. The information associated with the UE may include location data, signal data (e.g., transmission power headroom data associated with the UE, uplink signal-to-interference-plus-noise ratio (SINR) data as determined by the base station, uplink path loss data determined by the base station, etc.), UE state data (an indication that the UE is associated with a low power mode, an amount of power in a battery associated with the UE, a charge state indication associated with the UE, etc.), etc. The base station may determine a waveform (e.g., DFT-s-OFDM or CP-OFDM) for the UE to utilize in further uplink transmissions based on the uplink data received from the UE. In some cases, the base station may determine which waveform for the UE to utilize based on additional information, such as a traffic type associate with a UE uplink queue (e.g., bursty traffic sent using CP-OFDM) and/or a congestion level associated with the base station.

In some cases, the base station may utilize the location data and/or radio signal timing advance (TA) estimation to determine a distance between the UE and the base station. In some examples, the base station may determine if the distance is above a threshold distance and determine which waveform to utilize based on whether or not the distance is above the threshold distance. For example, the base station may determine to utilize using a DFT-s-OFDM waveform when the UE is closer to an edge of a cellular network and using a CP-OFDM waveform when the UE is closer to a cellular network.

In some cases, the base station may determine which waveform to utilize based on a type of base station that the UE will be communicating the uplink transmission with. For example, the UE can connect to one base station using a Fifth Generation (5G) New Radio (NR) connection and also connect to another base station using a Fourth Generation (4G) Long-Term Evolution (LTE) connection. The base station may determine to utilize a DFT-s-OFDM waveform when the UE is communicating with a LTE type base station and determine to utilize a CP-OFDM waveform when the UE is communicating with an NR type base station.

In some examples, once the base station determines the waveform for the UE to utilize in uplink transmissions, the base station may send an indication to the UE identifying which waveform to utilize for uplink transmissions. For example, the UE may read and/or otherwise detect a physical downlink control channel (PDCCH) every transmission time interval (TTI). Once a waveform is determined, the base station may use a bit in a particular resource element (RE) of the PDCCH frame to configure the UE to select the determined waveform. In one example, the base station may utilize a bit in RE 7 in the 3rd physical resource block (PRB) of the PDCCH.

In some examples, the base station can send an indication to a UE to change an uplink waveform in connection with a radio resource control (RRC) reconfiguration message.

In some examples, the base station may continually receive additional uplink data from the UE and provide the UE with dynamic waveform selection by determining which waveform the UE should utilize and sending an indication of the waveform type via the PDCCH.

In some examples, the techniques discussed herein can be implemented in the context of protocols associated with one or more of 3G, 4G, 4G LTE, 5G protocols. In some examples, the network implementations can support stand-alone architectures, non-standalone architectures, dual connectivity, carrier aggregation, etc. Example implementations are provided below with reference to the following figures.

FIG. 1 shows an example network environment 100 in which a UE 102 can connect to a telecommunication network to engage in communication sessions for voice calls, video calls, messaging, data transfers, and/or any other type of communication. The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

The UE 102 can include a battery 104 that stores energy used to power the functions of the UE 102. The battery 104 can be a lithium-ion (Li-ion) battery, a lithium-ion polymer (LiPo) battery, a nickel cadmium (NiCad) battery, a nickel-metal hydride (NiMH) battery, or other type of battery. In some examples, the battery 104 can be rechargeable. For instance, the energy level of the battery 104 can increase when the UE 102 is connected to a wall outlet, a portable charger, or another external power source. However, operations of the UE 102 can also use energy and thus drain the battery 104 when the battery 104 is not charging.

The telecommunication network can have one or more access networks that include base stations and/or other access points, as well as a core network 106 linked to the access network. The access networks and/or the core network 106 can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The UE 102 can wirelessly connect to one or more base stations or other access points of the access networks, and in turn be connected to the core network 106 via the base stations or other access points. In some examples, the core network 106 can be a packet core network of an LTE network, which may be referred to as an Evolved Packet Core (EPC). In other examples, the core network 106 can be a 5G core network.

The access networks can include a base station 108 that communicates with the UE 102 and the core network 106, as well as other UEs and other base stations not illustrated in FIG. 1. In some cases, the base station 108 may be associated with an LTE access network known as an Evolved UMTS Terrestrial Radio Access Network (E-UTRAN). Base stations of the LTE access network can be known as eNBs. In some cases, the base station 108 may be associated with a 5G access network with base stations known as gNBs.

The base station 108 can be connected to the core network 106. For example, the base station 108 may be connected to the core network 106 via 51 interfaces, or other interfaces, for transmission of user plane data and/or control plane data. The base station 108 may also be connected to other base stations over an X2 interface, or other interface, for transmission of user plane data and/or control plane data.

In some examples, the base station 108 may receive uplink data 110 from the UE 102 that includes information associated with the UE 102. The information associated with the UE 102 may include location data determined by a location component 112 of the UE 102, signal data (e.g., transmission power headroom data associated with the UE 102, uplink signal-to-interference-plus-noise ratio (SINR) data as determined by the base station 108, uplink path loss data determined by the base station 108, etc.), UE state data determined by a UE state component 114 of the UE 102 (an indication that the UE 102 is associated with a low power mode, an amount of power in the battery 104 associated with the UE 102, a charge state indication associated with the UE 102, etc.), etc.

The base station 108 may determine a waveform (e.g., DFT-s-OFDM or CP-OFDM) via a waveform component 116 for the UE 102 to utilize in further uplink transmissions based on the uplink data 110 received from the UE 102. In some cases, the base station 108 may determine which waveform for the UE 102 to utilize based on additional information, such as a traffic type associate with a UE uplink queue (e.g., bursty traffic sent using CP-OFDM) and/or a congestion level associated with the base station 108.

In some examples, the base station 108 can estimate or otherwise determine a location associated with the UE in the environment based at least in part on radio signal timing advance (TA) data. In some examples, the base station 108 can determine an amount of time associated with a signal propagating from the base station 108 to the UE 102. The base station 108 can receive timing advance data over time to estimate a position in the environment. In some examples, the base station 108 can receive timing advance data from other base stations in the environment to triangulate or otherwise determine a location of the UE in the environment.

In some cases, the base station 108 may utilize the location data included in the uplink data 110 (and/or timing advance data) to determine a distance between the UE 102 and the base station 108. In some examples, the base station 108 may determine if the distance is above a threshold distance and determine which waveform to utilize based on whether or not the distance is above the threshold distance. For example, the base station 108 may determine for the UE 102 to utilize DFT-s-OFDM when the UE 102 is closer to an edge of a cellular network and determine for the UE 102 to utilize CP-OFDM when the UE 102 is closer to the cellular network.

In some examples, the waveform component 116 can receive data about the UE, radio frequency conditions, network condition, and the like, and can input the data into a machine learned model to determine a waveform for the UE 102 to use to optimize an operation of the UE 102 and/or of the network in general. Additional details are discussed below in connection with FIG. 2, as well as throughout this disclosure.

In some cases, the base station 108 may determine which waveform to utilize based on a type of base station that the UE 102 will be communicating the subsequent uplink transmission with. For example, the UE 102 can connect to one base station using a Fifth Generation (5G) New Radio (NR) connection and also connect to another base station using a Fourth Generation (4G) Long-Term Evolution (LTE) connection. The base station 108 may determine to utilize DFT-s-OFDM when the UE 102 is communicating with a LTE type base station and determine to utilize CP-OFDM when the UE 102 is communicating with an NR type base station.

In some examples, the waveform component 116 of the base station 108 may prioritize particular information included in the uplink data 110. For example, the uplink data 110 may indicate that a power level of the battery 104 is below a threshold amount and may determine to utilize the DFT-s-OFDM (which is a power efficient waveform) despite the other information included in the uplink data 110 or other data determined by the base station 108.

In some examples, once the waveform component 116 of the base station 108 determines the waveform for the UE 102 to utilize in uplink transmissions, the base station 108 may send an indication 118 to the UE 102 identifying which waveform to utilize for uplink transmissions. For example, the UE 102 may read and/or otherwise detect a physical downlink control channel (PDCCH) every transmission time interval (TTI). Once a waveform is determined, the base station 108 may use (e.g., toggle) a bit in a particular resource element (RE) of the PDCCH frame during blind detection to configure the UE 102 to operate using the determined waveform via a waveform component 120.

In one example, the base station 108 may utilize (e.g., toggle) a bit in RE 7 in the 3rd physical resource block (PRB) of the PDCCH to indicate which waveform the UE 102 will operate with when communicating with uplink transmissions. In some examples, the UE 102 may include a reporting component 122 that facilitates communication of the location component 112, and/or the waveform component 120 to the waveform component 116.

In some examples, the base station 108 may continually receive additional uplink data from the UE 102 and provide the UE 102 with dynamic waveform selection by determining which waveform the UE 102 should utilize and sending an indication of the waveform type via the PDCCH.

Dynamically changing which waveform (e.g., DFT-s-OFDM or CP-OFDM) the UE 102 operates with during uplink transmissions enables the UE 102 to operate with the most effective waveform appropriate for the conditions of the UE 102, the base station 108, and/or the core network 106, which often change after a communication session has been established.

Figure 2:
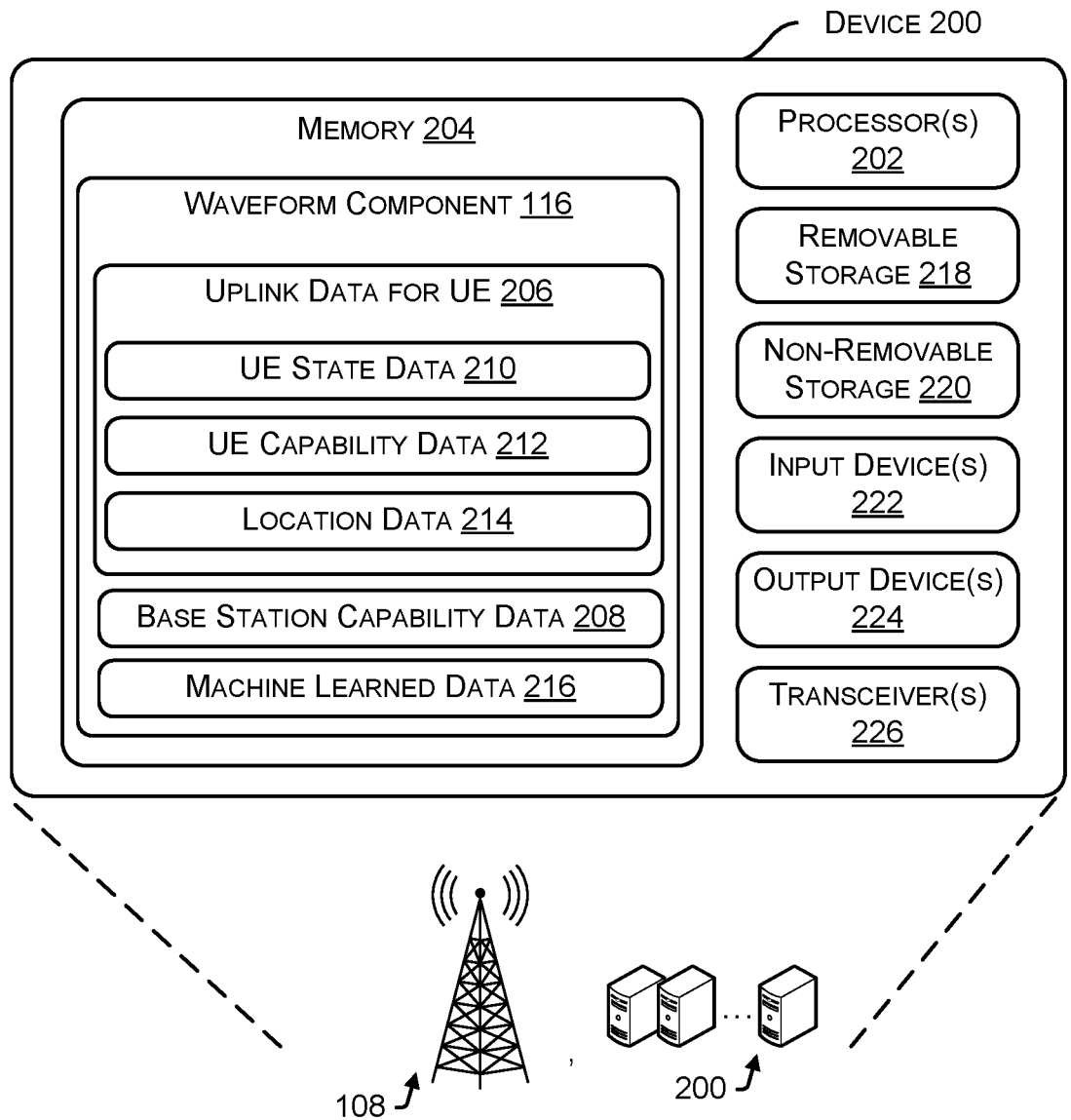
FIG. 2 is a block diagram of a device including a waveform component.

FIG. 2 is a block diagram of a device 200 including a dynamic waveform selection component. In some examples, the device 200 can be configured to implement the techniques discussed herein.

FIG. 2 shows only basic, high-level components of the device 200. Generally, the device 200 may comprise and/or may be implemented in any of various network components discussed herein, including those components illustrated in FIG. 1. For example, the device 200 may be implemented in the base station 108, which may include an eNB, a gNB, the core network 106, or other network device.

In various examples, the device 200 may include processor(s) 202 and memory 204. Depending on the exact configuration and type of computing device, the memory 204 may be volatile (such as RAM), non-volatile (such as ROM, flash memory, etc.) or some combination of the two. The memory 204 may include the waveform component 116, which may include uplink data for UE 206, base station capability data 208, UE state data 210, UE capability data 212, location data 214, and/or machine learned data 216.

In some examples, the waveform component 116 can include functionality to determine which waveform (e.g., DFT-s-OFDM or CP-OFDM) a UE, such as the UE 102 should utilize during uplink transmissions based on conditions associated with the UE. The waveform component 116 can use the data illustrated in FIG. 2 to receive information from the UE 102, determine which waveform to utilize based on the information, and send an indication to the UE 102 as to which waveform the UE 102 should utilize during an uplink transmission. For example, the waveform component 116 can determine which waveform to use based at least in part on the uplink data for UE 206, the base station capability data 208, the UE state data 210, the UE capability data 212, the location data 214, and/or the machine learned data 216.

In some examples, the uplink data for UE 206 can include data received by a UE, such as the UE 102, in an uplink transmission and may include information associated with the UE, such as UE state data 210, UE capability data 212, and location data 214. The UE 206 may utilize the uplink data for UE 206 in combination with the base station capability data 208 and the machine learned data 216 in order to determine which waveform the UE should implement when performing an uplink transmission.

In some examples, the base station capability data 208 can be based at least in part on signal data associated with a connection between the device 200 (e.g., a connection associate with the uplink data 110 and/or the indication 118) and a UE (e.g., the UE 102). For example, the base station capability data 208 (also referred to as capability data 208) can be based at least in part on signal data comprising one or more of Channel Quality Information (CQI) data, signal-to-noise ratio (SNR) data, signal-to-interference plus noise ratio (SINR) data, and/or signal-to-noise plus distortion ratio (SNDR) data.

The capability data 208 can also be based at least in part on an amount of traffic and/or congestion at the device 200 or associated with an LTE and/or NR connection. For example, as a number of devices and/or connections between the device 200 and other UEs increases, an amount of resources to be allocated to a UE may decrease. In some examples, an amount of resources may be based at least in part on subscriber level, device type, location, and the like. Accordingly, the capability data 208 can be based on a number of factors or data, as discussed herein.

In some examples, the UE state data 210 can include data received from the UE representing one or more conditions at the UE. In some examples, the UE state data 210 can be received from the UE state component 114. In some examples, the UE state data 210 can represent data about a display status of the UE, sensor data from the UE, an application type associated with the UE, an indication that the UE is associated with a low power mode, an amount of power in a battery associated with the UE, a charge state indication associated with the UE, as well as other factors.

In some examples, the UE state data 210 can include an indication that the UE is associated with a low power mode. For example, a UE may automatically enter a low-power state after a period of inactivity or based on a charge status. In some examples, a UE may enter a low-power state based on a user preference. In any event, the waveform component 116 can determine which waveform to use based on an indication of whether the UE is associated with a low power state. In some cases, the waveform component 116 may instruct the UE to utilize DFT-s-OFDM when the UE is operating in a low power state.

Similarly, the waveform component 116 can receive an indication of an amount of power in a battery associated with the UE. In some examples, the indication of an amount of power can be represented as a scalar value, as a percentage, as an amount of time until the UE battery is depleted based on current or estimated usage, and the like. The waveform component 116 can determine which waveform to use based on an indication of the amount of power in a battery associated with the UE.

In some examples, a charge state indication associated with the UE can indicate whether the UE is currently being charged and/or an amount of time to a full battery or to a particular charge level. The waveform component 116 can determine which waveform to use based on an indication of the charge state of the UE.

In some examples, the UE capability data 212 can include an indication of whether the UE supports an EN-DC connection, an LTE connection, and/or an NR connection. In some examples, the UE capability data 212 can include an indication of particular frequency bands that the UE supports so that the waveform component 116 can determine which waveform to use in order to can optimize traffic between multiple devices. In some examples, the UE capability data 212 can indicate various modulation schemes supported by the UE, which may factor into the base station capability data 208, as discussed above.

In some examples, the location data 214 can include a location of the UE. For example, the location data 214 can be based on GPS data, base station triangulation data, and the like. In some examples, the location data 214 can include velocity data and heading data, which may be indicative of the UE being at one location for a period of time or on the move (e.g., in a vehicle). In some cases, the waveform component 116 may utilize the location data 214 to determine a distance between the UE and the device 200. In some examples, the waveform component 116 may determine if the distance is above a threshold distance and determine which waveform to utilize based on whether or not the distance is above the threshold distance. For example, the waveform component 116 may determine for the UE to utilize DFT-s-OFDM when the UE is closer to an edge of a cellular network (e.g., further from the device 200) and determine for the UE to utilize CP-OFDM when the UE is closer to the cellular network (e.g., closer to the device 200).

In some examples, once the waveform component 116 determines the waveform for the UE to utilize in uplink transmissions, the waveform component 116 may toggle a bit in a particular resource element (RE) of a PDCCH frame to indicate which waveform should be used so that when the UE accesses the PDCCH during a TTI, the UE can determine which waveform to use based on the status of the bit. In one example, the waveform component 116 may utilize a bit in RE 7 in the 3rd physical resource block (PRB) of the PDCCH. In some examples, the bit may be toggled to a "1" or a "0" that indicates which waveform the UE should utilize. The "1" may be associated with a DFT-s-OFDM while the "0" may be associated with CP-OFDM, or vise versa.

In some examples, the machine learned data 216 can include one or more machine learned models or heuristics that can be used to determine which waveform the UE should use during an uplink transmission. For example, the machine learned data 216 can include weight(s) for various factors that can be used to set threshold(s) or likelihoods and/or determine factors that increase or decrease threshold(s) or likelihoods, and by how much.

In some examples, a machine learned model can determine a waveform for the UE to use based on a confidence level associated with a predicted outcome being above a threshold level (e.g., such that there is a likelihood above a threshold level that a waveform will improve a communication, reduce power consumption, etc.).

In some instances, the machine learned can determine a similarity score between UE state data (e.g., power condition(s), 4G/5G capability, carrier aggregation capability, location data, timing advance data, etc.), radio frequency conditions (e.g., transmission power headroom data associated with the UE 102, uplink signal-to-interference-plus-noise ratio (SINR) data as determined by the base station 108, uplink path loss data determined by the base station 108, etc.), network conditions (e.g., load levels, congestions, radio access technologies (e.g., 4G/5G), and the like and ground truth conditions representing various conditions and outcomes. Based on a similarity score of input data associated with positive outcomes (e.g., instructing the UE to use a waveform resulting in a good quality of service, reduced or optimal power consumption, etc.) or negative outcomes, the machine learned model can instruct the UE to use a particular waveform.

In some examples, the machine learned data 216 can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some examples, the waveform component 116 can be configured to weight different factors more heavily than other factors, and/or consider different factors in different orders. For example, the UE state data 210 may indicate that a power level of the battery of the UE is below a threshold amount and may determine to utilize the DFT-s-OFDM (which is a power efficient waveform) despite the other information included in the uplink data for UE 206 or other data determined by the waveform component 116.

In some examples, the processor(s) 202 is a central processing unit (CPU), a graphics processing unit (GPU), both CPU and GPU, or other processing unit or component known in the art. Furthermore, the processor(s) 202 may include any number of processors and/or processing cores. The processor(s) 202 is configured to retrieve and execute instructions from the memory 204.

The memory 204 can also be described as non-transitory computer-readable media or machine-readable storage memory, and may include removable and non-removable media implemented in any method or technology for storage of information, such as computer executable instructions, data structures, program modules, or other data.

The memory 204 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. The memory 204, the removable storage 218 and the non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The memory 204, the removable storage 218, and/or the non-removable storage 220 may in some cases include storage media used to transfer or distribute instructions, applications, and/or data. In some cases, the memory 204, the removable storage 218, and/or the non-removable storage 220 may include data storage that is accessed remotely, such as network-attached storage that the device 200 accesses over some type of data communications network.

In various examples, any or all of the memory 204, the removable storage 218, and/or the non-removable storage 220 may store programming instructions that, when executed, implement some or all of the function functionality described herein.

The device 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the device 200 also includes one or more wired or wireless transceiver(s) 226. For example, the transceiver(s) 226 can include a network interface card (NIC), a network adapter, a LAN adapter, or a physical, virtual, or logical address to connect to various networks, devices, or components illustrated in figures herein. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMAX, Bluetooth, infrared communication, and the like.

In some examples, the device 200 can be implemented as the UE 102 including the battery 104 and/or the reporting component 122.

Figure 3:
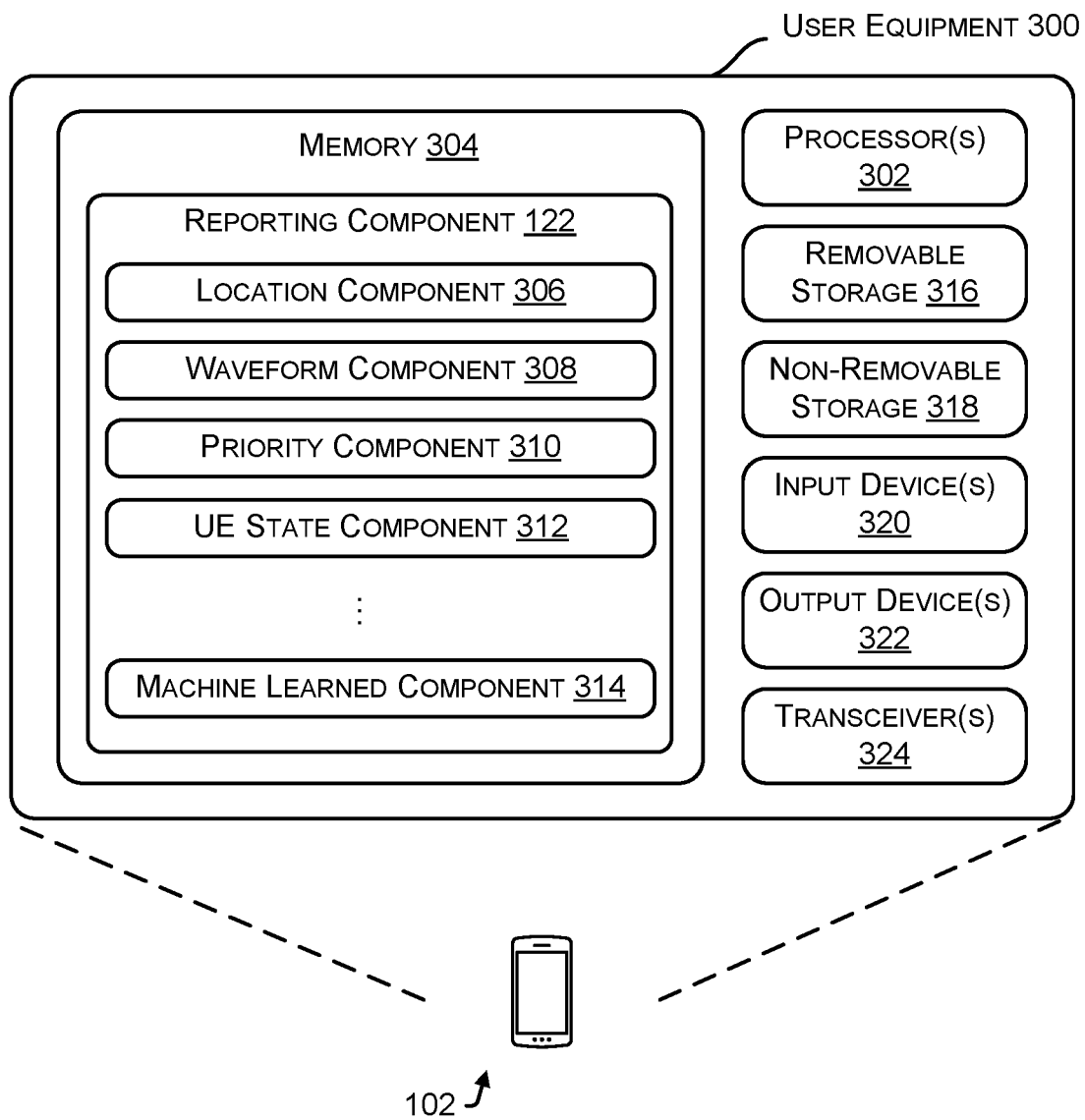
FIG. 3 a block diagram of a device including a reporting component.

FIG. 3 is a block diagram of a UE 300 including components for determining attributes for utilizing a waveform in an uplink transmission. In some examples, the UE 300 (also referred to as a device 300) can be configured to implement some or all of the techniques discussed herein.

FIG. 3 shows basic, high-level components of the device 300. Generally, the device 300 may comprise and/or may be implemented in any of various network components discussed herein, including those components illustrated in FIG. 1.

In various examples, the device 300 may include processor(s) 302 and memory 304. Depending on the exact configuration and type of computing device, the memory 304 may be volatile (such as RAM), non-volatile (such as ROM, flash memory, etc.) or some combination of the two. The memory 304 may include the reporting component 122, which may include a location component 306, a waveform component 308, a priority component 310, and/or a UE state component 312, and a machine learned component 314.

In some examples, the reporting component 122 can include functionality to gather or otherwise determine data about the UE and to report the data to another computing device (e.g., the base station 108) or to report a determined priority level associated with the one or more data.

In further examples, the reporting component 122 can determine and report a user ID (identifier) that can indicate or correspond to a customer or user profile, such as an individual or organization using the device 300 or to whom the device 300 belongs. As another example, a user ID may indicate or correspond to a particular customer account with which the device 300 is associated. As yet another example, a user ID may indicate or correspond to a provider of services with which a data packet is associated.

In some examples, the location component 306 may be used to determine location data (e.g., a location) associated with the UE 300 and provide the location data to a computing device, such as the base station 108.

In some examples, the waveform component 308 may be used to determine waveform data associated with the UE 300 and provide the waveform data to a computing device, such as the base station 108. The waveform data may include data indicating which waveform is currently being used and/or which waveforms have previously been used. In some cases, the waveform component 308 may cause the UE 300 to switch waveforms, such as to a DFT-s-OFDM or CP-OFDM. For example, the UE 300 may access a bit in a particular resource element (RE) of a PDCCH frame during a TTI to determine which waveform should be used. In one example, the waveform component 308 may access a bit in RE 7 in the 3rd physical resource block (PRB) of the PDCCH. In some examples, the bit may be toggled to a "1" or a "0" that indicates which waveform the UE 300 should utilize. The "1" may be associated with a DFT-s-OFDM while the "0" may be associated with CP-OFDM, or vise versa.

In some examples, the priority component 310 may be used to determine a priority of the data provided to a computing device, such as the base station 108. For example, the priority component 310 may indicate that a power level of the UE 300 is below a threshold amount and may prioritize power level data ahead of other types of data to be sent to the base station 108.

In some examples, the UE state component 312 can include data representing one or more conditions at the UE. In some examples, the UE state component 312 can represent data about a display status of the UE, sensor data from the UE, an indication that the UE is associated with a low power mode, an amount of power in a battery associated with the UE, a charge state indication associated with the UE, as well as other factors. The UE state component 312 can be input or otherwise provided to the machine learned component 314 (or another model or machine learned component discussed herein) to determine a priority level associated with a data request and/or waveform for the UE to use.

In some examples, the machine learned component 314 can include one or more machine learned models or heuristics that can be used to determine a priority level of downlink data associated with a data request. For example, the machine learned component 314 can include weight(s) for various factors that can be used to set priority level(s) or likelihoods and/or determine factors that increase or decrease a priority level, and by how much.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from the memory 304.

The memory 304 can also be described as non-transitory computer-readable media or machine-readable storage memory, and may include removable and non-removable media implemented in any method or technology for storage of information, such as computer executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 300 also includes additional data storage devices (removable and/or non-removable) such as, for example, magnetic disks, optical disks, or tape. Such additional storage is illustrated in FIG. 2 by removable storage 316 and non-removable storage 318. Tangible computer-readable media can include volatile and non-volatile, removable and non-removable media implemented in any method or technology for storage of information, such as computer readable instructions, data structures, program modules, or other data. The memory 304, the removable storage 316 and the non-removable storage 318 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The memory 304, the removable storage 316, and/or the non-removable storage 318 may in some cases include storage media used to transfer or distribute instructions, applications, and/or data. In some cases, the memory 304, the removable storage 316, and/or the non-removable storage 318 may include data storage that is accessed remotely, such as network-attached storage that the device 300 accesses over some type of data communications network.

In various examples, any or all of the memory 304, the removable storage 316, and/or the non-removable storage 318 may store programming instructions that, when executed, implement some or all of the function functionality described herein.

The device 300 also can include input device(s) 320, such as a keypad, a cursor control, a touch-sensitive display, voice input device, etc., and output device(s) 322 such as a display, speakers, printers, etc. These devices are well known in the art and need not be discussed at length here.

As illustrated in FIG. 3, the device 300 also includes one or more wired or wireless transceiver(s) 324. For example, the transceiver(s) 324 can include a network interface card (NIC), a network adapter, a LAN adapter, or a physical, virtual, or logical address to connect to various networks, devices, or components illustrated in figures herein. To increase throughput when exchanging wireless data, the transceiver(s) 324 can utilize multiple-input/multiple-output (MIMO) technology. The transceiver(s) 324 can comprise any sort of wireless transceivers capable of engaging in wireless, radio frequency (RF) communication. The transceiver(s) 324 can also include other wireless modems, such as a modem for engaging in Wi-Fi, WiMAX, Bluetooth, infrared communication, and the like.

Figure 4:
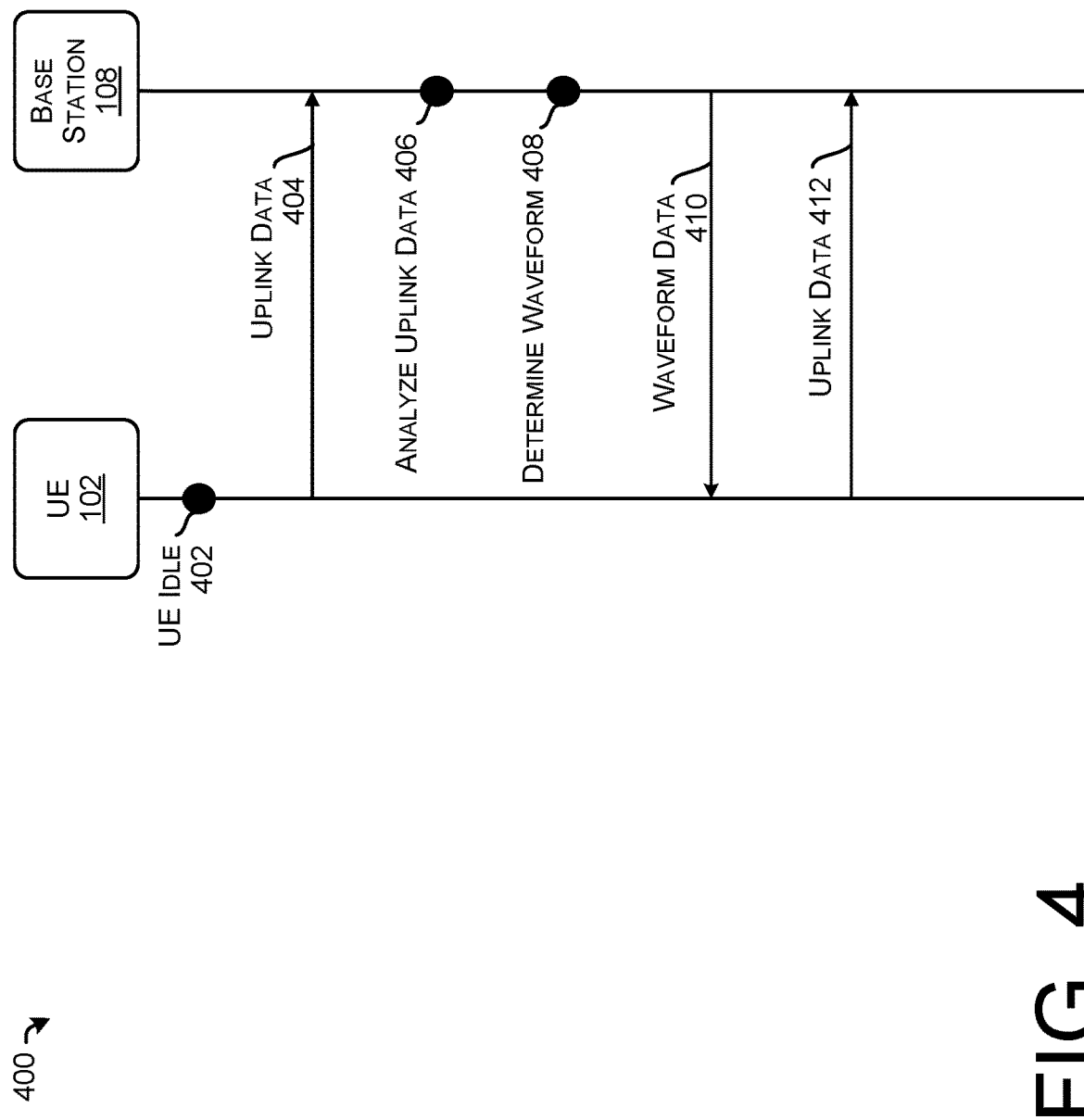
FIG. 4 shows a sequence diagram of example operations and messages a base station can use to dynamically switch an uplink waveform.
Figure 5:
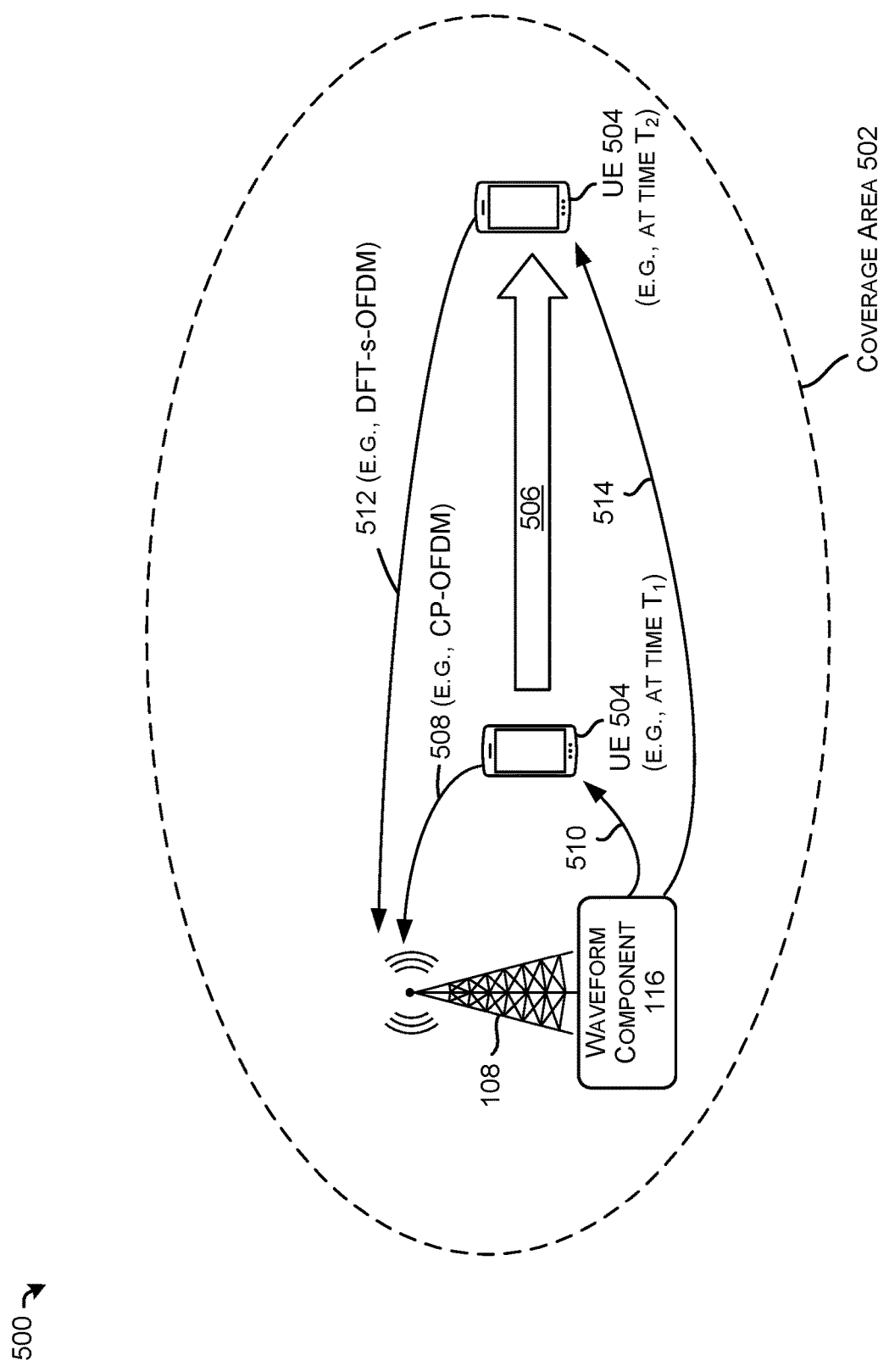
FIG. 5 illustrates an example of dynamic waveform switching.
Figure 6:
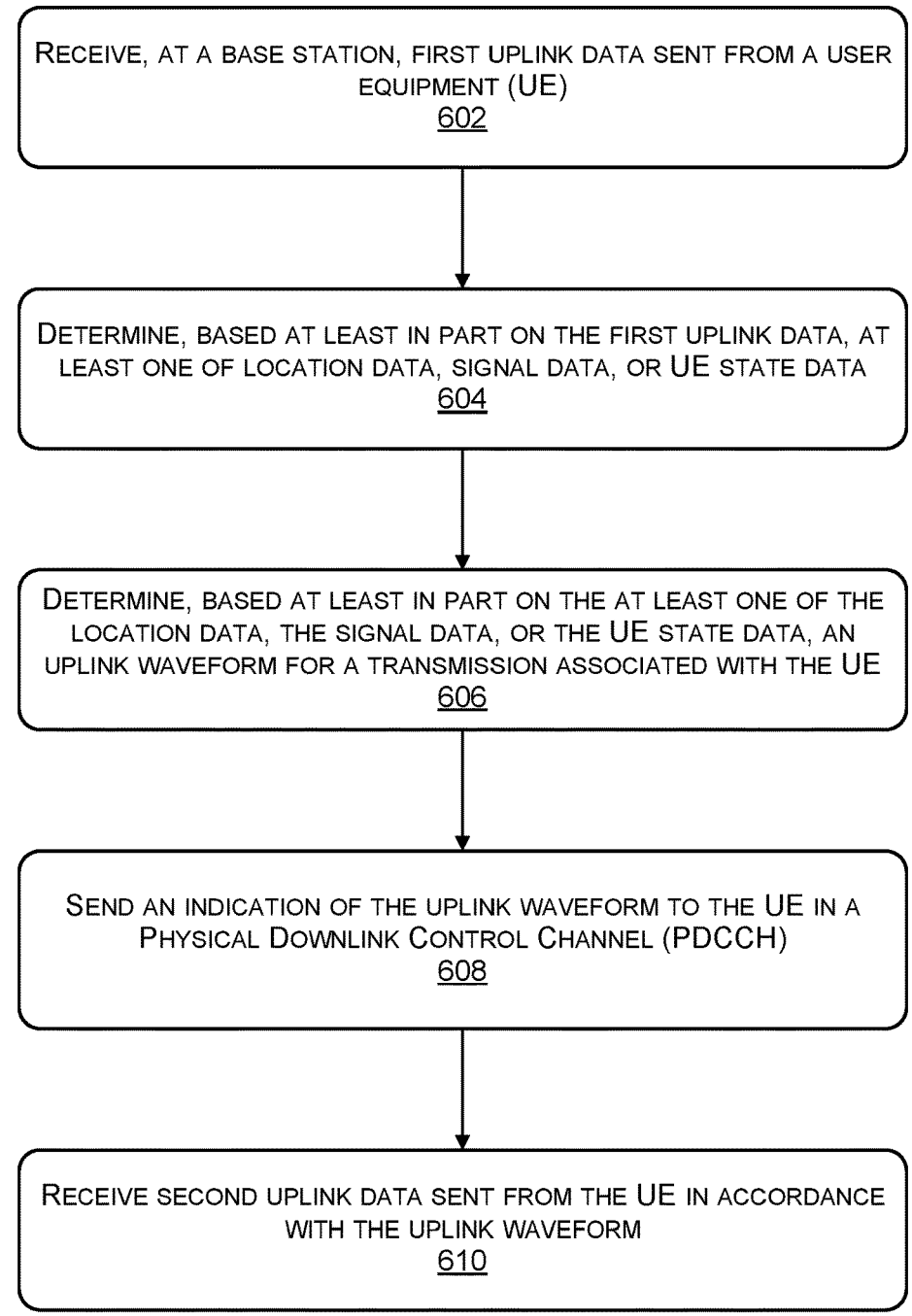
FIG. 6 illustrates an example process for dynamic waveform switching.

FIGS. 4-6 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 4 shows a sequence diagram 400 of example operations and messages a base station can use to dynamically switch a waveform being used be a UE for uplink transmission.

At point 402, the UE 102 can be idle. For example, the UE 102 may be in a Radio Resource Control (RRC) idle state in which no active connection exists between the UE 102 and the base station 108. However, when the UE 102 determines that data is to be exchanged with the UE 102, the UE 102 can enter an active or connected state and send uplink data to the base station 108 at point 404. For example, the uplink data may include information associated with the UE 102, such as location data determined by a location component of the UE 102, signal data (e.g., transmission power headroom data associated with the UE 102, uplink signal-to-interference-plus-noise ratio (SINR) data as determined by the base station 108, uplink path loss data determined by the base station 108, etc.), UE state data determined by a UE state component of the UE 102 (an indication that the UE 102 is associated with a low power mode, an amount of power in the battery 104 associated with the UE 102, a charge state indication associated with the UE 102, etc.), etc.

At point 406, the base station 108 may analyze the uplink data and at point 408 the base station may determine a waveform based on the uplink data. For example, base station 108 may determine a waveform (e.g., DFT-s-OFDM or CP-OFDM) via a waveform component for the UE 102 to utilize in further uplink transmissions based on the uplink data received from the UE 102. In some cases, the base station 108 may determine which waveform for the UE 102 to utilize based on additional information, such as a traffic type associate with a UE uplink queue (e.g., bursty traffic sent using CP-OFDM).

In some cases, the base station 108 may utilize the location data included in the uplink data to determine a distance between the UE 102 and the base station 108. In some examples, the base station 108 may determine if the distance is above a threshold distance and determine which waveform to utilize based on whether or not the distance is above the threshold distance. For example, the base station 108 may determine for the UE 102 to utilize DFT-s-OFDM when the UE 102 is closer to an edge of a cellular network and determine for the UE 102 to utilize CP-OFDM when the UE 102 is closer to the cellular network.

In some cases, the base station 108 may determine which waveform to utilize based on a type of base station that the UE 102 will be communicating the subsequent uplink transmission with. For example, the UE 102 can connect to one base station using a Fifth Generation (5G) New Radio (NR) connection and also connect to another base station using a Fourth Generation (4G) Long-Term Evolution (LTE) connection. The base station 108 may determine to utilize DFT-s-OFDM when the UE 102 is communicating with a LTE type base station and determine to utilize CP-OFDM when the UE 102 is communicating with an NR type base station.

In some examples, the waveform component of the base station 108 may prioritize particular information included in the uplink data. For example, the uplink data may indicate that a power level of the battery 104 is below a threshold amount and may determine to utilize the DFT-s-OFDM (which is a power efficient waveform) despite the other information included in the uplink data 110 or other data determined by the base station 108.

At point 410 the base station 108 may send waveform data to the UE 102 indicating which waveform the UE 102 should utilize when communicating via an uplink transmission. For example, once the base station 108 determines the waveform for the UE 102 to utilize in uplink transmissions, the base station 108 may toggle a bit in a particular resource element (RE) of a PDCCH frame to indicate which waveform should be used so that when the UE 102 accesses the PDCCH during a TTI, the UE 102 can determine which waveform to use based on the status of the bit. In one example, the base station 108 may utilize a bit in RE 7 in the 3rd physical resource block (PRB) of the PDCCH. In some examples, the bit may be toggled to a "1" or a "0" that indicates which waveform the UE 102 should utilize. The "1" may be associated with a DFT-s-OFDM while the "0" may be associated with CP-OFDM, or vise versa.

At point 412 the UE 102 can send additional uplink data utilizing the waveform specified by the base station 108. For example, the UE 102 may communicate with the base station 108 based on a TTI schedule and provide uplink data to the base station 108 with each communication. As conditions associated with the UE 102 and/or the base station 108 change, the uplink data may also change and the base station 108 can determine if the UE 102 should change the waveform being used for uplink transmissions in order to maximize performance of the UE 102.

FIG. 5 illustrates an example 500 of dynamic waveform switching.

The example 500 includes a coverage area 502 associated with the base station 108. The example 500 includes a UE 504 associated with a first time $T_1$ (or a first state) and the UE 504 associated with a second time $T_2$ (or a second state). The change in time or state is represented as an arrow 506 (also referred to as a change of state 506). In some examples, the change of state 506 can represent a movement of the UE 504 in the environment, a change in uplink radio frequency characteristics, and the like.

The UE 504 can send uplink data 508 to the base station 108. In some examples, the uplink data 508 can be associated with a CP-OFDM waveform. In some examples, the uplink data 508 can be based on waveform data 510 received from the waveform component 116. In some examples, the waveform data 510 can be determined according to the techniques discussed herein.

The UE 504 can send uplink data 512 to the to the base station 108. In some examples, the uplink data 512 can be associated with a DFT-s-OFDM waveform. In some examples, the uplink data 512 can be based on waveform data 514 received from the waveform component 116. In some examples, the waveform data 514 can be determined according to the techniques discussed herein.

Accordingly, the example 500 illustrates dynamic waveform switching based on a change in state of a UE over time.

FIG. 5 illustrates example process for dynamic waveform switching. The example process 600 can be performed by the base station 108 and/or by the device 200 comprising the waveform component 116, or another component or device as discussed herein.

At operation 602, the process can include receiving, at a base station, first uplink data sent from a user equipment (UE). For example, the UE 102 can wirelessly connect to one or more base stations or other access points of the access networks, and in turn be connected to the core network 106 via the base stations or other access points. In some examples, the core network 106 can be a packet core network of an LTE network, which may be referred to as an Evolved Packet Core (EPC). In other examples, the core network 106 can be a 5G core network. In some examples, the base station 108 may receive uplink data 110 from the UE 102 that includes information associated with the UE 102.

At operation 604, the process can include determining, based at least in part on the first uplink data, at least one of location data, signal data, or UE state data. For example, the uplink data may include information associated with the UE 102, such as location data determined by a location component of the UE 102, signal data (e.g., transmission power headroom data associated with the UE 102, uplink signal-to-interference-plus-noise ratio (SINR) data as determined by the base station 108, uplink path loss data determined by the base station 108, etc.), UE state data determined by a UE state component of the UE 102 (an indication that the UE 102 is associated with a low power mode, an amount of power in the battery 104 associated with the UE 102, a charge state indication associated with the UE 102, etc.), etc.

At operation 606, the process can include determining, based at least in part on the at least one of the location data, the signal data, or the UE state data, an uplink waveform for a transmission associated with the UE. For example, base station 108 may determine a waveform (e.g., DFT-s-OFDM or CP-OFDM) via a waveform component for the UE 102 to utilize in further uplink transmissions based on the uplink data received from the UE 102. In some cases, the base station 108 may determine which waveform for the UE 102 to utilize based on additional information, such as a traffic type associate with a UE uplink queue (e.g., bursty traffic sent using CP-OFDM).

In some cases, the base station 108 may utilize the location data included in the uplink data to determine a distance between the UE 102 and the base station 108. In some examples, the base station 108 may determine if the distance is above a threshold distance and determine which waveform to utilize based on whether or not the distance is above the threshold distance. For example, the base station 108 may determine for the UE 102 to utilize DFT-s-OFDM when the UE 102 is closer to an edge of a cellular network and determine for the UE 102 to utilize CP-OFDM when the UE 102 is closer to the cellular network.

In some cases, the base station 108 may determine which waveform to utilize based on a type of base station that the UE 102 will be communicating the subsequent uplink transmission with. For example, the UE 102 can connect to one base station using a Fifth Generation (5G) New Radio (NR) connection and also connect to another base station using a Fourth Generation (4G) Long-Term Evolution (LTE) connection. The base station 108 may determine to utilize DFT-s-OFDM when the UE 102 is communicating with a LTE type base station and determine to utilize CP-OFDM when the UE 102 is communicating with an NR type base station.

In some examples, the waveform component of the base station 108 may prioritize particular information included in the uplink data. For example, the uplink data may indicate that a power level of the battery 104 is below a threshold amount and may determine to utilize the DFT-s-OFDM (which is a power efficient waveform) despite the other information included in the uplink data 110 or other data determined by the base station 108.

At operation 608, the process can include sending an indication of the uplink waveform to the UE in a Physical Downlink Control Channel (PDCCH). For example, once the base station 108 determines the waveform for the UE 102 to utilize in uplink transmissions, the base station 108 may toggle a bit in a particular resource element (RE) of a PDCCH frame to indicate which waveform should be used so that when the UE 102 accesses the PDCCH during a TTI, the UE 102 can determine which waveform to use based on the status of the bit. In one example, the base station 108 may utilize a bit in RE 7 in the 3rd physical resource block (PRB) of the PDCCH. In some examples, the bit may be toggled to a "1" or a "0" that indicates which waveform the UE 102 should utilize. The "1" may be associated with a DFT-s-OFDM while the "0" may be associated with CP-OFDM, or vise versa.

At operation 610, the process can include receiving second uplink data sent from the UE in accordance with the uplink waveform. For example, the UE 102 may communicate with the base station 108 based on a TTI schedule and provide uplink data to the base station 108 with each communication. As conditions associated with the UE 102 and/or the base station 108 change, the uplink data may also change and the base station 108 can determine if the UE 102 should change the waveform being used for uplink transmissions in order to maximize performance of the UE 102.

FIG. 6 illustrates another example process for dynamically switching waveforms. The example process 700 can be performed by the UE 102 and/or by the device 300 comprising the reporting component 122, or another component or device as discussed herein.

At operation 702, the process can include sending, to a base station, first uplink data using a first uplink waveform. For example, the UE 102 may send uplink data 110 to the base station 108 that includes information associated with the UE 102. The information associated with the UE 102 may include location data determined by a location component 112 of the UE 102, signal data (e.g., transmission power headroom data associated with the UE 102, uplink signal-to-interference-plus-noise ratio (SINR) data as determined by the base station 108, uplink path loss data determined by the base station 108, etc.), UE state data determined by a UE state component 114 of the UE 102 (an indication that the UE 102 is associated with a low power mode, an amount of power in the battery 104 associated with the UE 102, a charge state indication associated with the UE 102, etc.), etc. The base station 108 may determine a waveform (e.g., DFT-s-OFDM or CP-OFDM) via a waveform component 116 for the UE 102 to utilize in further uplink transmissions based on the uplink data 110 received from the UE 102. In some cases, the base station 108 may determine which waveform for the UE 102 to utilize based on additional information, such as a traffic type associate with a UE uplink queue (e.g., bursty traffic sent using CP-OFDM).

At operation 704, the process can include receiving an indication to switch to a second uplink waveform via a Physical Downlink Control Channel (PDCCH). For example, once the waveform component 116 of the base station 108 determines the waveform for the UE 102 to utilize in uplink transmissions, the base station 108 may send an indication 118 to the UE 102 identifying which waveform to utilize for uplink transmissions. For example, the UE 102 may read and/or otherwise detect a physical downlink control channel (PDCCH) every transmission time interval (TTI). Once a waveform is determined, the base station 108 may use (e.g., toggle) a bit in a particular resource element (RE) of the PDCCH frame during blind detection to configure the UE 102 to operate using the determined waveform via a waveform component 120. In one example, the base station 108 may utilize (e.g., toggle) a bit in RE 7 in the 3rd physical resource block (PRB) of the PDCCH to indicate which waveform the UE 102 will operate with when communicating with uplink transmissions. In some examples, the UE 102 may include a reporting component 122 that facilitates communication of the location component 112, and/or the waveform component 120 to the waveform component 116.

At operation 706, the process can include sending, to the base station, second uplink data using the second uplink waveform. For example, the UE 102 may continually send additional uplink data to the base station 108 and provide the base station 108 with updated uplink data as conditions associated with the UE 102 change.

CONCLUSION

Although features and/or methodological acts are described above, it is to be understood that the appended claims are not necessarily limited to those features or acts. Rather, the features and acts described above are disclosed as example forms of implementing the claims.

What is claimed is:
1. A method comprising:
receiving, at a base station, first uplink data sent from a user equipment (UE);
determining, based at least in part on the first uplink data, location data, signal data, and UE state data;
inputting the location data, the signal data, and the UE state data to a machine learned model, wherein the machine learned model associates a first uplink waveform with data meeting at least one of a plurality of thresholds and a second uplink waveform with data that does not meet at least one of the plurality of the thresholds, and the first uplink waveform is one of a Discrete Fourier Transform Spread Orthogonal Frequency Division Multiplexing (DFT-s-OFDM) waveform and a Cyclic Prefix OFDM (CP-OFDM) waveform and the second uplink waveform is the other of DFT-s-OFDM and CP-OFDM;
receiving, from the machine learned model, an uplink waveform for a transmission associated with the UE, wherein the uplink waveform is one of the first uplink waveform and the second uplink waveform and is determined by the machine learned model by a comparison of the location data, the signal data, and the UE state data to the plurality of thresholds;

sending an indication of the uplink waveform to the UE in a Physical Downlink Control Channel (PDCCH); and receiving second uplink data sent from the UE in accordance with the uplink waveform.

2. The method of claim 1, wherein inputting the location data, the signal data, and the UE state data comprises inputting the location data, the method further comprising:

determining that a distance between the base station and the UE is above a threshold distance, wherein the threshold distance is one threshold of the plurality of thresholds; and determining the uplink waveform based at least in part on the distance being above the threshold distance.

3. The method of claim 1, wherein inputting the location data, the signal data, and the UE state data comprises inputting the signal data, wherein the signal data comprises at least one of:

transmission power headroom data received from the UE;

uplink signal-to-interference-plus-noise ratio (SINR) data as determined by the base station; or uplink path loss data determined by the base station.

4. The method of claim 1, wherein the UE state data comprises at least one of:

an indication that the UE is associated with a low power mode;

an amount of power in a battery associated with the UE; or a charge state indication associated with the UE.

5. The method of claim 1, wherein:

the base station is a Fifth-Generation (5G) base station.

6. The method of claim 1, wherein the indication of the uplink waveform is not sent in association with a radio resource control (RRC) reconfiguration message.

7. The method of claim 1, wherein the indication is a first indication, the method further comprising:

receiving a second indication of a traffic type to be transmitted by the UE; and determining the uplink waveform further based at least in part on the traffic type.

8. The method of claim 1, further comprising:

determining a congestion level associated with the base station; and inputting the congestion level to the machine learned model, wherein the uplink waveform is further based at least in part on the congestion level.

9. A system comprising:

one or more processors; and one or more non-transitory computer-readable media storing computer-executable instructions that, when executed, cause the one or more processors to perform operations comprising:

receiving, at a base station, first uplink data sent from a user equipment (UE);

determining, based at least in part on the first uplink data, multiple ones of location data, signal data, or UE state data;

determining, based at least in part on the multiple ones of the location data, the signal data, or the UE state data, an uplink waveform for a transmission associated with the UE, wherein:

the uplink waveform is one of a first uplink waveform and a second uplink waveform and is determined by a comparison of the multiple ones of the location data, the signal data, or the UE state data to a plurality of thresholds, the first uplink waveform is associated with data meeting at least one threshold of the plurality of thresholds and the second uplink waveform is associated with data that does not meet at least one threshold of the plurality of thresholds, and the first uplink waveform is one of a Discrete Fourier Transform Spread Orthogonal Frequency Division Multiplexing (DFT-s-OFDM) waveform and a Cyclic Prefix OFDM (CP-OFDM) waveform and the second uplink waveform is the other of DFT-s-OFDM and CP-OFDM;

sending an indication of the uplink waveform to the UE in a Physical Downlink Control Channel (PDCCH); and receiving second uplink data sent from the UE in accordance with the uplink waveform.

10. The system of claim 9, wherein determining the multiple ones of the location data, the signal data, or the UE state data comprises determining the location data, the operations further comprising:

determining that a distance between the base station and the UE is above a threshold distance, the threshold distance being a threshold of the plurality of thresholds; and determining the uplink waveform based at least in part on the distance being above the threshold distance.

11. The system of claim 9, wherein determining the multiple ones of the location data, the signal data, or the UE state data comprise determining the signal data, wherein the signal data comprises at least one of:

transmission power headroom data received from the UE;

uplink signal-to-interference-plus-noise ratio (SINR) data as determined by the base station; or uplink path loss data determined by the base station.

12. The system of claim 9, wherein determining the multiple ones of the location data, the signal data, or the UE state data comprises determining the UE state data, wherein the UE state data comprises at least one of:

an indication that the UE is associated with a low power mode;

an amount of power in a battery associated with the UE; or a charge state indication associated with the UE.

13. The system of claim 9, wherein determining the uplink waveform for the transmission associated with the UE comprises inputting the multiple ones of the location data, the signal data, or the UE state data to a machine learned model trained to determine the uplink waveform.

14. The system of claim 9, wherein the indication of the uplink waveform is not sent in association with a radio resource control (RRC) reconfiguration message.

15. A user equipment (UE) comprising:

one or more processors; and one or more non-transitory computer-readable media storing computer-executable instructions that, when executed, cause the one or more processors to perform operations comprising:

sending, to a base station, first uplink data using a first uplink waveform, wherein the first uplink data comprises multiple ones of location data, signal data, or UE state data;

receiving an indication to switch to a second uplink waveform via a Physical Downlink Control Channel (PDCCH), wherein the indication is determined by the base station based on a comparison of the first uplink data to a plurality of thresholds of a machine learned model; and sending, to the base station, second uplink data using the second uplink waveform, wherein the first uplink waveform is one of a Discrete Fourier Transform Spread Orthogonal Frequency Division Multiplexing (DFT-s-OFDM) waveform and a Cyclic Prefix OFDM (CP-OFDM) waveform and the second uplink waveform is the other of DFT-s-OFDM and CP-OFDM.

16. The UE of claim 15, wherein receiving the indication to switch to the second uplink waveform comprises accessing a bit in resource element seven (RE 7) in a third physical resource block (PRB) of the PDCCH.

\* \* \* \* \*